US011566125B2

(12) United States Patent
Sato et al.

(10) Patent No.: US 11,566,125 B2
(45) Date of Patent: Jan. 31, 2023

(54) THERMOPLASTIC ELASTOMER COMPOSITION FOR TIRES, AND TIRE

(71) Applicant: THE YOKOHAMA RUBBER CO., LTD., Tokyo (JP)

(72) Inventors: Shun Sato, Hiratsuka (JP); Shusaku Tomoi, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 48 days.

(21) Appl. No.: 16/771,528

(22) PCT Filed: Sep. 25, 2018

(86) PCT No.: PCT/JP2018/035433
§ 371 (c)(1),
(2) Date: Jun. 10, 2020

(87) PCT Pub. No.: WO2019/116673
PCT Pub. Date: Jun. 20, 2019

(65) Prior Publication Data
US 2021/0179835 A1    Jun. 17, 2021

(30) Foreign Application Priority Data
Dec. 12, 2017 (JP) .............................. JP2017-237794

(51) Int. Cl.
| | | |
|---|---|---|
| *C08L 29/04* | (2006.01) | |
| *B60C 1/00* | (2006.01) | |
| *C08L 25/08* | (2006.01) | |
| *C08L 23/08* | (2006.01) | |
| *C08K 5/05* | (2006.01) | |
| *C08L 67/00* | (2006.01) | |
| *C08L 23/26* | (2006.01) | |

(52) U.S. Cl.
CPC ............... *C08L 29/04* (2013.01); *B60C 1/00* (2013.01); *B60C 1/0008* (2013.01); *C08K 5/05* (2013.01); *C08L 23/08* (2013.01); *C08L 23/26* (2013.01); *C08L 25/08* (2013.01); *C08L 67/00* (2013.01); *C08L 2207/04* (2013.01)

(58) Field of Classification Search
CPC .......... C08L 29/04; C08L 23/08; C08L 67/00; C08L 25/08; C08L 23/26; C08L 2207/04; B60C 1/00; B60C 1/0008; C08K 5/05
See application file for complete search history.

(56) References Cited

U.S. PATENT DOCUMENTS

| | | | |
|---|---|---|---|
| 10,189,980 B2 * | 1/2019 | Sato | ........................ C08L 77/00 |
| 2001/0041762 A1 * | 11/2001 | Ikawa | ..................... C08L 77/06 |
| | | | 524/262 |
| 2008/0314493 A1 | 12/2008 | Hara | |
| 2012/0214943 A1 | 8/2012 | Sato et al. | |
| 2013/0112330 A1 * | 5/2013 | Tomoi | ..................... B32B 27/28 |
| | | | 152/510 |
| 2013/0146194 A1 | 6/2013 | Kawaguchi | |
| 2015/0004344 A1 | 1/2015 | Abe et al. | |
| 2015/0133605 A1 | 5/2015 | Sato et al. | |
| 2016/0160019 A1 | 6/2016 | Sato | |
| 2016/0168370 A1 * | 6/2016 | Sato | ........................ C08L 77/02 |
| | | | 428/36.6 |
| 2016/0263868 A1 | 9/2016 | Tomoi et al. | |

FOREIGN PATENT DOCUMENTS

| | | |
|---|---|---|
| CN | 102575020 A | 7/2012 |
| CN | 102675662 A | 9/2012 |
| CN | 104024290 A | 9/2014 |
| CN | 104334634 A | 2/2015 |
| CN | 105408413 A | 3/2016 |
| CN | 105764685 A | 7/2016 |
| EP | 3 321 318 A1 | 5/2018 |
| JP | 2009-528925 A | 8/2009 |
| JP | 2010-507510 A | 3/2010 |
| JP | 2012-46622 A | 3/2012 |
| JP | 2015-013489 A | 1/2015 |
| WO | WO 2007/051144 A1 | 5/2007 |
| WO | WO 2008/051253 A1 | 5/2008 |

* cited by examiner

*Primary Examiner* — Angela C Scott
(74) *Attorney, Agent, or Firm* — Polsinelli PC

(57) ABSTRACT

Provided is a thermoplastic elastomer composition which does not undergo viscosity increase during melt molding, gelation and molding failure, while having excellent heat resistance and durability. A thermoplastic elastomer composition for tires, which contains (A) an ethylene-vinyl alcohol copolymer or a modified ethylene-vinyl alcohol copolymer, (B) a thermoplastic resin or a thermoplastic elastomer, which has a melting point of 200° C. or higher, and (C) an acid-modified elastomer in an amount of 20% by volume or more based on the amount of all polymer components. This thermoplastic elastomer composition for tires is characterized in that if this thermoplastic elastomer composition for tires is extruded at a piston speed of 5 min/min at a temperature that is higher than the melting point of the thermoplastic resin or thermoplastic elastomer (B) by 20° C. in a viscosity measurement by means of a capillary rheometer, the viscosity $\eta_2$ in 800 seconds after the start of the extrusion is less than 120% of the viscosity $\eta_1$ in 200 seconds after the start of the extrusion.

20 Claims, No Drawings

THERMOPLASTIC ELASTOMER COMPOSITION FOR TIRES, AND TIRE

CROSS REFERENCE TO RELATED APPLICATIONS

This application is a National Phase filing under 35 U.S.C. § 371 of PCT/JP2018/035433 filed on 25 Sep. 2018; which application in turn claims priority to Application No. 2017-237794 filed in Japan on 12 Dec. 2017. The entire contents of each application are hereby incorporated by reference.

FIELD

The present invention relates to a thermoplastic elastomer composition for tires and a tire. More particularly, the present invention relates to a thermoplastic elastomer composition for tires comprising ethylene-vinyl alcohol copolymer, a thermoplastic resin having a melting point of not less than 200° C., and an acid-modified elastomer, and a tire manufactured using the composition.

BACKGROUND

As a thermoplastic elastomer composition for inner liners of pneumatic tires, a thermoplastic elastomer composition comprising a thermoplastic resin having a melting point of not less than 200° C., such as an ethylene-vinyl alcohol copolymer, or nylon 6, and an acid-modified elastomer is known (Japanese Unexamined Patent Publication No. 2012-46622).

CITATION LIST

Patent Literature

[PTL 1] Japanese Unexamined Patent Publication (Kokai) No. 2012-46622

SUMMARY

Technical Problem

However, although nylon 6 is excellent in heat resistance and durability, when nylon 6 is blended with an ethylene-vinyl alcohol copolymer, the viscosity of nylon 6 increases and a gel is generated at the time of melt molding, which may cause molding failure.

An object of the present invention is to provide a thermoplastic elastomer composition which does not cause an increase in viscosity during melt molding, does not cause gelation, does not cause molding failure, and has excellent heat resistance and durability.

Solution to Problem

The present inventor has found that in a thermoplastic elastomer composition comprising an ethylene-vinyl alcohol copolymer, a thermoplastic resin having a melting point of not less than 200° C., and an acid-modified elastomer, if melt viscosity $\eta_2$ at 800 seconds from the start of extrusion is less than 120% of melt viscosity $\eta_1$ at 200 seconds when extruded at a piston speed of 5 min/min in measuring viscosity with a capillary rheometer, the viscosity during melt molding does not increase (no gelation), no gel is mixed into molded products, no defects due to gel are caused, and a composition having a balanced heat resistance and durability can be provided, thereby completing the present invention.

Specifically, the present invention is a thermoplastic elastomer composition for tires comprising an ethylene-vinyl alcohol copolymer or modified ethylene-vinyl alcohol copolymer (A), a thermoplastic resin or thermoplastic elastomer (B) having a melting point of not less than 200° C., and not less than 20% by volume, based on the total volume of all polymer components in the composition, of an acid-modified elastomer (C), wherein when the composition is extruded at a piston speed of 5 min/min and at a temperature that is 20° C. higher than the melting point of the thermoplastic resin or thermoplastic elastomer (B) in measuring the viscosity with a capillary rheometer, viscosity $\eta_2$ at 800 seconds from the start of extrusion is less than 120% of viscosity $\eta_1$ at 200 seconds from the start of extrusion.

The present invention includes the following embodiments.

[1] A thermoplastic elastomer composition for tires comprising an ethylene-vinyl alcohol copolymer or modified ethylene-vinyl alcohol copolymer (A), a thermoplastic resin or thermoplastic elastomer (B) having a melting point of not less than 200° C., and not less than 20% by volume, based on the total volume of all polymer components in the composition, of an acid-modified elastomer (C), wherein when the composition is extruded at a piston speed of 5 min/min and at a temperature that is 20° C. higher than the melting point of the thermoplastic resin or thermoplastic elastomer (B) in measuring the viscosity with a capillary rheometer, viscosity $\eta_2$ at 800 seconds from the start of extrusion is less than 120% of viscosity $\eta_1$ at 200 seconds from the start of extrusion.

[2] The thermoplastic elastomer composition according to [1], wherein the thermoplastic resin or thermoplastic elastomer (B) having a melting point of not less than 200° C. is at least one selected from the group consisting of a polyester resin and a polyester elastomer.

[3] The thermoplastic elastomer composition according to [1] or [2], wherein the acid-modified elastomer (C) is at least one selected from the group consisting of an acid-modified polyolefin elastomer and an acid-modified styrene elastomer.

[4] The thermoplastic elastomer composition according to any one of [1] to [3], wherein the acid-modified elastomer (C) forms a dispersed phase, and the ethylene-vinyl alcohol copolymer or modified ethylene-vinyl alcohol copolymer (A) forms a continuous phase.

[5] The thermoplastic elastomer composition according to any one of [1] to [4], further comprising from 0.1 to 10 parts by weight of a compound (D) having two or more hydroxyl groups in one molecule based on 100 parts by weight of the acid-modified elastomer (C).

[6] The thermoplastic elastomer composition according to any one of [1] to [5], wherein the modified ethylene-vinyl alcohol copolymer is an aliphatic polyester-modified ethylene-vinyl alcohol copolymer.

[7] The thermoplastic elastomer composition according to any one of [1] to [6], wherein the volume ratio (A/B) of the ethylene-vinyl alcohol copolymer or modified ethylene-vinyl alcohol copolymer (A) to the thermoplastic resin or thermoplastic elastomer (B) is from 50/50 to 95/5.

[8] A tire using the thermoplastic elastomer composition according to any one of [1] to [7].

Advantageous Effects of Invention

The thermoplastic elastomer composition of the present invention does not cause an increase in viscosity or does not gel during melt molding, does not suffer from vulcanization failure, and has excellent heat resistance and durability.

DESCRIPTION OF EMBODIMENTS

The thermoplastic elastomer composition for tires of the present invention is a thermoplastic elastomer composition for tires comprising an ethylene-vinyl alcohol copolymer or modified ethylene-vinyl alcohol copolymer (A), a thermoplastic resin or thermoplastic elastomer (B) having a melting point of not less than 200° C., and not less than 20% by volume, based on the total volume of all polymer components in the composition, of an acid-modified elastomer (C), wherein when the composition is extruded at a piston speed of 5 min/min and at a temperature that is 20° C. higher than the melting point of the thermoplastic resin or thermoplastic elastomer (B) in measuring the viscosity with a capillary rheometer, viscosity $\eta_2$ at 800 seconds from the start of extrusion is less than 120% of viscosity $\eta_1$ at 200 seconds from the start of extrusion.

Component (A) is an ethylene-vinyl alcohol copolymer or a modified ethylene-vinyl alcohol copolymer.

An ethylene-vinyl alcohol copolymer (hereinafter, also referred to as "EVOH") is a copolymer composed of an ethylene unit (—CH$_2$CH$_2$—) and a vinyl alcohol unit (—CH$_2$—CH (OH)—), and may contain another constituent unit in addition to the ethylene unit and the vinyl alcohol unit as long as an effect of the present invention is not impaired. The ethylene-vinyl alcohol copolymer used in the present invention has an ethylene unit content, or an ethylene composition ratio of preferably from 32 to 48% by mole, and more preferably from 38 to 48% by mole. When the ethylene composition ratio of an ethylene-vinyl alcohol copolymer is too small, the flexibility of the ethylene-vinyl alcohol copolymer decreases, and the durability decreases. Conversely, when the ethylene composition ratio is too large, the gas barrier property will decrease. The ethylene-vinyl alcohol copolymer is a saponified product of an ethylene-vinyl acetate copolymer, and the degree of saponification is preferably 90% or more, and more preferably 98% or more. When the degree of saponification of an ethylene-vinyl alcohol copolymer is too small, the gas barrier property decreases, and the thermal stability also decreases. An ethylene-vinyl alcohol copolymer is commercially available, and can be obtained, for example, from KURARAY CO., LTD. under the trade name "EVAL®", and from The Nippon Synthetic Chemical Industry Co., Ltd. under the trade name "Soarnol®". Examples of an ethylene-vinyl alcohol copolymer having an ethylene composition ratio of from 32 to 48% by mole and a saponification degree of 90% or more include "EVAL®" H171B having an ethylene composition ratio of 38% by mole and a saponification degree of 99% or more, E171B having an ethylene composition ratio of 44% by mole and a saponification degree of 99% or more manufactured by KURARAY CO., LTD. and "Soarnol®" H4815B having an ethylene composition ratio 48% by mole and a saponification degree of 99% or more, A4412B having an ethylene composition ratio of 42% by mole and a saponification degree of 99% or more, DC3212B having an ethylene composition ratio of 32% by mole and a saponification degree of 99% or more manufactured by Nippon Synthetic Chemical Industry Co., Ltd.

A modified ethylene-vinyl alcohol copolymer (hereinafter, also referred to as "modified EVOH") is a copolymer in which the main repeating units are an ethylene unit (—CH$_2$CH$_2$—) and a vinyl alcohol unit (—CH$_2$—CH (OH)—), and contains a repeating unit other than these repeating units. Preferred is an aliphatic polyester-modified ethylene-vinyl alcohol copolymer.

The aliphatic polyester-modified ethylene-vinyl alcohol copolymer is a thermoplastic resin obtained by grafting an aliphatic polyester to a hydroxyl group of an ethylene-vinyl alcohol copolymer.

The ratio of the content of EVOH units forming the backbone of an aliphatic polyester-modified ethylene-vinyl alcohol copolymer to the content of aliphatic polyester units grafted on this backbone (content of EVOH units/content of aliphatic polyester units) is, in parts by weight, usually from 40/60 to 99/1, and preferably from 60/40 to 95/5, and particularly preferably from 80/20 to 90/10. When the content of the EVOH unit is too low, the gas barrier property tends to decrease. The ratio of the EVOH unit content to the aliphatic polyester unit content can be controlled by the charging ratio of EVOH to the aliphatic polyester during the graft reaction.

For the method of producing an aliphatic polyester-modified ethylene-vinyl alcohol copolymer, a known method of grafting an aliphatic polyester to EVOH forming a backbone can be used, and a method of ring-opening polymerization of a lactone in the presence of EVOH is particularly preferably used.

A lactone to be used is not particularly limited as long as the number of carbon atoms of the lactone is from 3 to 10. Such a lactone, when having no substituent, is represented by the following formula (1), wherein n is an integer of from 2 to 9, and preferably, n is from 4 to 5.

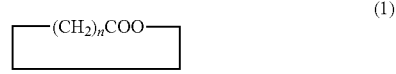

(1)

Specific examples of the lactone include β-propiolactone, γ-butyrolactone, ε-caprolactone, and δ-valerolactone, and preferred are ε-caprolactone and δ-valerolactone, and more preferred is ε-caprolactone is from the viewpoint of being inexpensive and easily available.

These lactones can be used in combination of two or more.

In a ring-opening polymerization reaction, it is preferable to add a conventionally known ring-opening polymerization catalyst, and examples thereof include a titanium compound and a tin compound. Specific examples thereof include a titanium alkoxide such as tetra-n-butoxytitanium, tetraisobutoxytitanium, and tetraisopropoxytitanium; a tin alkoxide such as dibutyldibutoxytin; and a tin ester compound such as dibutyltin diacetate. Among them, tetra-n-butoxytitanium is preferred because it is inexpensive and easily available.

Examples of a method of grafting EVOH by ring-opening polymerization of a lactone include a method of melt-kneading EVOH and a lactone in a kneader, and examples of the kneader at the time of melt-kneading include a single-screw extruder, a twin-screw extruder, a Banbury mixer, a kneader, and a Brabender.

The time and temperature of the melt-kneading are not particularly limited, and the temperature at which both materials are melted, and the time at which the grafting is completed may be appropriately selected, and the time and temperature of the melt-kneading are usually preferably from 50 to 250° C. for 10 seconds to 24 hours, and particularly preferably from 150 to 230° C. for 5 minutes to 10 hours.

The ethylene content of EVOH used as a raw material is usually, but not limited to, from 20 to 60% by mole, and preferably from 25 to 50% by mole, and more preferably from 30 to 45% by mole. When the ethylene content is too high, the gas barrier property tends to decrease, and conversely when the ethylene content is too low, the reactivity of ring-opening polymerization with a lactone tends to decrease.

The degree of saponification of EVOH is usually, but not limited to, 80% by mole or more, and preferably from 90 to 99.99% by mole, and particularly preferably from 99 to 99.9% by mole. When the saponification degree is too low, the gas barrier property tends to decrease.

The melt flow rate (MFR) used as an index of the molecular weight in EVOH is usually from 0.1 to 100 g/10 minutes under the conditions of 210° C. and a load of 2,160 g, and preferably from 0.5 to 50 g/10 min, and particularly preferably from 1 to 25 g/10 min. When the MFR value is too low, the reactivity of ring-opening polymerization with a lactone tends to decrease.

As the EVOH, a combination of two or more EVOHs having different ethylene contents, saponification degrees and MFRs may be used as long as the average value satisfies the above-described requirements.

In the composition of the present invention, an ethylene-vinyl alcohol copolymer and a modified ethylene-vinyl alcohol copolymer may be used in combination.

Component (B) is a thermoplastic resin or thermoplastic elastomer having a melting point of not less than 200° C. The thermoplastic resin or thermoplastic elastomer having a melting point of not less than 200° C. is not limited as long as the thermoplastic elastomer composition of the present invention satisfies that when the composition is extruded at a piston speed of 5 min/min and at a temperature that is 20° C. higher than the melting point of the thermoplastic resin or thermoplastic elastomer (B) in measuring the viscosity with a capillary rheometer, viscosity $\eta_2$ at 800 seconds from the start of the extrusion is less than 120% of viscosity $\eta_1$ at 200 seconds from the start of extrusion, and is preferably at least one selected from the group consisting of polyester resins and polyester elastomers.

Examples of the polyester resin include a polymethylene terephthalate resin, a polyethylene terephthalate resin, a polybutylene terephthalate resin, a polyethylene naphthalate resin, and a polybutylene naphthalate resin, and preferred is a polybutylene terephthalate resin. The polybutylene terephthalate resin (hereinafter, also referred to as "PBT resin") is a polycondensate of terephthalic acid with 1,4-butanediol. As the polybutylene terephthalate resin, a commercially available product can be used. Examples of a commercially available product of the polybutylene terephthalate resin include "Novaduran®" manufactured by Mitsubishi Engineering Plastics Co., Ltd., "Trecon®" manufactured by Toray Industries, Inc., and "Geranex®" manufactured by Wintech Polymer Ltd.

Examples of the polyester elastomer include a polybutylene terephthalate elastomer. The polybutylene terephthalate elastomer (hereinafter, also referred to as "PBT elastomer") is a thermoplastic elastomer whose hard segment is polybutylene terephthalate and whose soft segment is aliphatic polyether or aliphatic polyester. As the polybutylene terephthalate elastomer, a commercially available product can be used. Examples of a commercially available polybutylene terephthalate elastomers include "Perprene®" P type and "Perprene®" S type manufactured by Toyobo Co., Ltd., and "Hytrel®" manufactured by DU PONT-TORAY CO., LTD.

Component (C) is an acid-modified elastomer. The acid-modified elastomer preferably, but not limited to, at least one selected from the group consisting of an acid-modified polyolefin elastomer and an acid-modified styrene elastomer.

Examples of the acid-modified polyolefin elastomer include an ethylene-α-olefin copolymer modified with an unsaturated carboxylic acid or unsaturated carboxylic acid anhydride, or an ethylene-unsaturated carboxylic acid copolymer or a derivative thereof. Examples of the ethylene-α-olefin copolymer modified with an unsaturated carboxylic acid or unsaturated carboxylic acid anhydride include a maleic anhydride-graft modified product of an ethylene-propylene copolymer, an ethylene-butene copolymer, an ethylene-hexene copolymer, or an ethylene-octene copolymer. Examples of the ethylene-unsaturated carboxylic acid copolymer or a derivative thereof include an ethylene-acrylic acid copolymer, an ethylene-methacrylic acid copolymer, an ethylene-methyl acrylate copolymer, and an ethylene-methyl methacrylate copolymer. A preferable acid-modified polyolefin elastomer is a maleic anhydride-modified product of an ethylene-propylene copolymer or ethylene-butene copolymer. A commercially available acid-modified polyolefin elastomer can be used. Examples of the commercially available acid-modified polyolefin elastomer include "Tuffmer®" MH7010, MP7020, MP0610 manufactured by Mitsui Chemicals, Inc.

Examples of the acid-modified styrene elastomer include a maleic anhydride-modified styrene-ethylene-butylene-styrene copolymer, a maleic anhydride-modified styrene-ethylene propylene-styrene copolymer, a maleic anhydride-modified styrene-butadiene-styrene copolymer, and a maleic anhydride-modified styrene-isoprene-styrene copolymer. Preferred is a maleic anhydride-modified styrene-ethylene-butylene-styrene copolymer. A commercially available acid-modified styrene elastomer can be used. Examples of the commercially available maleic anhydride-modified styrene-ethylene-butylene-styrene copolymer include "Tough-Tech®" M1943, M1913, and M1911, manufactured by Asahi Kasei Corporation, and "Clayton®" FG1924, manufactured by Clayton Polymer Japan Co., Ltd.

The thermoplastic elastomer composition of the present invention includes a phase structure composed of a continuous phase (matrix) and a dispersed phase (so-called sea-island structure). The ethylene-vinyl alcohol copolymer or modified ethylene-vinyl alcohol copolymer (A) forms a continuous phase. The acid-modified elastomer (C) forms a dispersed phase. The thermoplastic resin or thermoplastic elastomer (B) having a melting point of not less than 200° C. forms a continuous phase or a dispersed phase depending on the viscosity and the content, and preferably forms a continuous phase from the viewpoint of imparting heat resistance.

The thermoplastic elastomer composition of the present invention may comprise a polymer component (P) other than components (A), (B), and (C) as long as an effect of the present invention is not impaired.

The content of the acid-modified elastomer (C) is not less than 20% by volume, and preferably from 30 to 72% by volume, and more preferably from 40 to 70% by volume, based on the total amount of the polymer components. When the content of the acid-modified elastomer (C) is too small, the durability may be insufficient. When the content is too large, the ethylene-vinyl alcohol copolymer (A) is not able to form a continuous phase, and the acid-modified elastomer (C) is not able to form a dispersed phase, by which the melt moldability may be deteriorated or gas barrier property may be insufficient due to a decrease in the fluidity. The amount of all polymer components means the total volume of components (A), (B), and (C) when the thermoplastic elastomer composition does not comprise a polymer component other than components (A), (B), and (C); and the amount of all polymer components means the total volume of components (A), (B), (C), and (P) when the thermoplastic elastomer composition comprises a polymer component (P) other than components (A), (B), and (C).

The volume ratio (A/B) of the ethylene-vinyl alcohol copolymer or modified ethylene-vinyl alcohol copolymer (A) to the thermoplastic resin or thermoplastic elastomer (B) is preferably from 50/50 to 95/5, and more preferably from 55/45 to 90/10, and still more preferably from 60/40 to 85/15. When the ratio of component (B) is too small, sufficient heat resistance may not be obtained, and when the ratio is too large, gas barrier property may be insufficient.

The thermoplastic elastomer composition of the present invention preferably further comprises a compound (D) having two or more hydroxyl groups in one molecule. By including the compound (D) having two or more hydroxyl groups in one molecule, there is an advantage that a cross-linking effect is obtained by interacting with the acid-modified elastomer (C) and durability is improved.

Examples of the compound (D) having two or more hydroxyl groups in one molecule includes a diol such as tris(2-hydroxyethyl)isocyanurate, ethylene glycol, or propylene glycol, a triol such as glycerin, and a sugar alcohol such as xylitol or sorbitol, and preferred is tris(2-hydroxyethyl)isocyanurate or glycerin.

The content of the compound (D) having two or more hydroxyl groups in one molecule, based on 100 parts by weight of the acid-modified elastomer (C), is from 0.1 to 10 parts by weight, and preferably from 0.2 to 8 parts by weight, and more preferably from 0.5 to 5 parts by weight. When the content of the compound (D) having two or more hydroxyl groups in one molecule is too small, an effect of improving the durability cannot be obtained. When the content is too large, the fluidity decreases and the melt moldability deteriorates.

In the thermoplastic elastomer composition of the present invention, when the composition is extruded at a piston speed of 5 mm/min and a temperature that is 20° C. higher than the melting point of the thermoplastic resin or thermoplastic elastomer (B) in measuring the viscosity with a capillary rheometer, viscosity $\eta_2$ at 800 seconds from the start of the extrusion is less than 120% of viscosity $\eta_1$ at 200 seconds from the start of extrusion. $\eta_2$ is preferably less than 115% of $\eta_1$, and more preferably less than 110% of $\eta_1$. When the ratio of $\eta_2$ to $\eta_1$ is too large, retention and gelation due to heat history may occur when a thermoplastic elastomer composition is melt-molded.

The thermoplastic elastomer composition of the present invention may comprise various additives other than the compound (D) having two or more hydroxyl groups in one molecule as long as an effect of the present invention is not impaired. Examples of the additives include a cross-linking agent, an anti-aging agent, a plasticizer, a processing aid, a crosslinking accelerating aid, a crosslinking accelerator, a reinforcing agent (filler), a scorch inhibitor, a mastication accelerator, an organic modifier, a softener, and a tackifier.

The thermoplastic elastomer composition of the present invention can be produced by, but not limited to, melt-kneading an ethylene-vinyl alcohol copolymer or modified ethylene-vinyl alcohol copolymer (A), a thermoplastic resin or thermoplastic elastomer (B) having a melting point of not less than 200° C., an acid-modified elastomer (C), optionally a compound (D) having two or more hydroxyl groups in one molecule, another polymer component, and another additive.

The thermoplastic elastomer composition of the present invention is used for producing tires.

The thermoplastic elastomer composition of the present invention is preferably used for inner liners of pneumatic tires.

The present invention is also a tire using the thermoplastic elastomer composition.

As the method of producing a pneumatic tire, a conventional method can be used. For example, the thermoplastic elastomer composition of the present invention is extruded into a film having a predetermined width and thickness, and the extruded film is applied as an inner liner to a cylinder on a tire forming drum. Members used for normal tire production, such as a carcass layer, a belt layer, a tread layer, and the like made of unvulcanized rubber are sequentially laminated thereon and extracted from a drum to obtain a green tire. Then, by heating and vulcanizing the green tire according to a conventional method, a desired pneumatic tire can be produced.

EXAMPLES (1) Raw materials

The raw materials used in the following Examples and Comparative Examples are as follows.

EVOH: "Soarnol®" H4815B manufactured by Nippon Synthetic Chemical Industry Co., Ltd.

Modified EVOH: "Soarnol®" SG743, manufactured by Nippon Synthetic Chemical Industry Co., Ltd., which is EVOH modified with aliphatic polyester.

Nylon 6: "UBE Nylon®" 1013B manufactured by UBE INDUSTRIES, LTD.

PBT resin: "Novaduran®" 5010R5, manufactured by Mitsubishi Engineering Plastics Co., Ltd., having a melting point of 224° C.

PBT elastomer (1): "Perprene®" ε-450B, manufactured by Toyobo Co., Ltd., which is a copolymer comprising a hard segment of polybutylene terephthalate and a soft segment of polyether and has a melting point of 222° C.

PBT elastomer (2): "Perprene®" S-9001, manufactured by Toyobo Co., Ltd., which is a copolymer comprising a hard segment of polybutylene terephthalate and a soft segment of aliphatic polyester and has a melting point of 223° C.

Maleic anhydride-modified polyolefin elastomer (hereinafter, abbreviated as "Mah-PO"): "Tuffmer®" MH7010 manufactured by Mitsui Chemicals, Inc.

Maleic anhydride-modified styrene-ethylene-butylene-styrene copolymer (hereinafter, abbreviated as "Mah-SEBS"): "ToughTech®" M1943 manufactured by Asahi Kasei Corporation.

Tris(2-hydroxyethyl)isocyanurate (hereinafter, also referred to as "THEIC"): "THEIC" manufactured by SHIKOKU CHEMICALS CORPORATION.

Glycerin: Glycerin DG manufactured by NOF Corporation.

(2) Preparation of Thermoplastic Elastomer Composition

An ethylene-vinyl alcohol copolymer or modified ethylene-vinyl alcohol (A), a thermoplastic resin or thermoplastic elastomer (B) having a melting point of not less than 200° C., an acid-modified elastomer (C), and a compound (D) having two or more hydroxyl groups in one molecule were introduced into a cylinder of a twin screw extruder manufactured by THE JAPAN STEEL WORKS, LTD. with the composition shown in Tables 1 and 2, and were transported to a kneading zone set at a temperature of 240° C. and a residence time of about from 3 to 8 minutes and melt-kneaded, and the melt-kneaded product was extruded from a die attached to a discharge port into strands. The obtained strand-like extrudate was pelletized with a resin pelletizer to obtain a pelletized thermoplastic elastomer composition.

(3) Viscosity Measurement

Pellets of the thermoplastic elastomer composition prepared in the above-described (2) were pre-dried at 120° C. for 5 hours, and the melt viscosity (Pa·s) thereof was measured using a capillary rheometer by detecting a load under the conditions of a temperature of 250° C., a piston speed of 5 min/min, a capillary length of 10 mm, and a capillary inner diameter of 1 mm. When the melt viscosity at the time of 200 seconds from the start of extrusion was $\eta_1$ and the melt viscosity at the time of 800 seconds from the start of extrusion was $\eta_2$, when $$\eta_2/\eta_1 < 1.2$$

was satisfied, it was determined that there was no increase in viscosity. When there was no increase in viscosity, when the thermoplastic elastomer composition was melt-molded, retention or gelation due to heat history was unlikely to occur, and a molded product such as a film or sheet that can be used for tire production and quality can be obtained.

(4) Evaluation of Gel Generation

The pellet-like thermoplastic elastomer composition prepared in the above-described (2) was formed into a film having an average thickness of 0.1 mm by using a 40 mmφ single screw extruder with 550 mm width T-die manufactured by Plastic Giken Co., Ltd. under the extrusion conditions of extrusion temperatures C1/C2/C3/C4/die=230/240/250/250/250° C., a cooling roll temperature of 50° C., and a take-up speed of 4 m/min.

A film at 90 minutes from the start of extrusion was visually observed, and a film having a length of 100 cm and having 10 or more gels of 2 mm×2 mm or more was determined to have gel generation, and a film having less than 10 gels was determined to have no gel generation.

(5) Evaluation of Vulcanization Failure

A film of the thermoplastic elastomer composition obtained in the above-described (4) was arranged on the innermost surface of a tire to produce a green tire, and then vulcanized by a conventional method to produce a radial tire 195/65R15.

After vulcanization, the inner surface of the tire was observed, and whether or not the thermoplastic elastomer composition film had a failure such as foaming or poor appearance was confirmed.

(6) Evaluation of Durability

The pellet-like thermoplastic elastomer composition prepared in the above-described (2) was formed into a sheet having an average thickness of 1.0 mm by using a 40 mmφ single screw extruder with 200 mm width T-die manufactured by Plastic Giken Co., Ltd. under the extrusion conditions of extrusion temperatures C1/C2/C3/C4/die=230/240/250/250/250° C., a cooling roll temperature of 50° C., and a take-up speed of 1.0 m/min, and a dumbbell (JIS No. 3) was punched out of the sheet, set in a fatigue tester, repeatedly given a constant strain of 40% in a −20° C. atmosphere, and the number of breaks was measured.

With an index with the number of breaks of Comparative Example 1 taken as 100, not less than 130 was determined to be excellent, not less than 70 and less than 130 was determined to be favorable, not less than 50 and less than 70 was determined to be acceptable, and less than 50 was determined to be unacceptable. When the determination was excellent, favorable, or acceptable, the durability can be satisfied even when the composition was provided to a tire structural member, and when the determination was unacceptable, it was determined that the durability was insufficient when the composition was provided to a tire.

TABLE 1

| | | | Comparative Example 1 | Comparative Example 2 | Comparative Example 3 | Example 1 | Example 2 | Example 3 | Example 4 |
|---|---|---|---|---|---|---|---|---|---|
| (A) | EVOH | parts by volume | 50 | 40 | 70 | 40 | 56 | 28 | 48 |
| | Modified EVOH | parts by volume | | | | | | | |
| (B) | PBT resin | parts by volume | | | | 10 | 14 | 7 | 12 |
| | PBT elastomer (1) | parts by volume | | | | | | | |
| | PBT elastomer (2) | parts by volume | | | | | | | |
| | Nylon 6 | parts by volume | | 10 | 30 | | | | |
| (C) | Mah-PO | parts by volume | 50 | 50 | | 50 | 30 | 65 | 40 |
| | Mah-SEBS | parts by volume | | | | | | | |
| (D) | THEIC | parts by volume | 1 | 1 | 1 | 1 | 1 | 1 | 1 |
| | Glycerin | parts by volume | | | | | | | |
| $\eta_2/\eta_1$ | | | 100 | 180 | 140 | 105 | 100 | 110 | 100 |
| Viscosity increase | | | None | Yes | Yes | None | None | None | None |
| Gel generation | | | None | Yes | Yes | None | None | None | None |
| Vulcanization failure | | | Yes | None | None | None | None | None | None |
| Number of breaks (index) | | | 100 | 140 | 40 | 120 | 80 | 200 | 90 |
| Durability (determination) | | | Favorable | Excellent | Unacceptable | Favorable | Favorable | Excellent | Favorable |

TABLE 2

| | | | Example 5 | Example 6 | Comparative Example 4 | Example 7 | Example 8 | Example 9 |
|---|---|---|---|---|---|---|---|---|
| (A) | EVOH | parts by volume | 40 | 40 | 48 | 40 | 38.5 | 40 |
| | Modified EVOH | parts by volume | | | | | | |
| (B) | PBT resin | parts by volume | 10 | 10 | | 10 | 16.5 | 10 |

TABLE 2-continued

|  |  |  | Example 5 | Example 6 | Comparative Example 4 | Example 7 | Example 8 | Example 9 |
|---|---|---|---|---|---|---|---|---|
|  | PBT elastomer (1) | parts by volume |  |  |  |  |  |  |
|  | PBT elastomer (2) | parts by volume |  |  |  |  |  |  |
|  | Nylon 6 | parts by volume |  |  | 12 |  |  |  |
| (C) | Mah-PO | parts by volume | 50 | 50 | 40 | 50 | 55 | 50 |
|  | Mah-SEBS | parts by volume |  |  |  |  |  |  |
| (D) | THEIC | parts by volume | 1 | 1 | 1 | 1 | 1 | 1 |
|  | Glycerin | parts by volume |  |  |  |  |  |  |
| $\eta_2/\eta_1$ |  |  | 100 | 100 | 250 | 110 | 115 | 100 |
| Viscosity increase |  |  | None | None | Yes | None | None | None |
| Gel generation |  |  | None | None | Yes | None | None | None |
| Vulcanization failure |  |  | None | None | None | None | None | None |
| Number of breaks (index) |  |  | 150 | 150 | 110 | 120 | 130 | 120 |
| Durability (determination) |  |  | Excellent | Excellent | Favorable | Favorable | Excellent | Favorable |

INDUSTRIAL APPLICABILITY

The thermoplastic elastomer composition of the present invention can be suitably utilized for producing tires.

The invention claimed is:

1. A thermoplastic elastomer composition for tires comprising an ethylene-vinyl alcohol copolymer or modified ethylene-vinyl alcohol copolymer (A), a thermoplastic elastomer (B) having a melting point of not less than 200° C., and not less than 20% by volume, based on the total volume of all polymer components in the composition, of an acid-modified elastomer (C), wherein when the composition is extruded at a piston speed of 5 mm/min and at a temperature that is 20° C. higher than the melting point of the thermoplastic elastomer (B) in measuring the viscosity with a capillary rheometer, viscosity $\eta_2$ at 800 seconds from the start of extrusion is less than 120% of viscosity $\eta_1$ at 200 seconds from the start of extrusion.

2. The thermoplastic elastomer composition according to claim 1, wherein thermoplastic elastomer (B) having a melting point of not less than 200° C. is a polyester elastomer.

3. The thermoplastic elastomer composition according to claim 2, wherein the acid-modified elastomer (C) is at least one selected from the group consisting of an acid-modified polyolefin elastomer and an acid-modified styrene elastomer.

4. The thermoplastic elastomer composition according to claim 2, wherein the acid-modified elastomer (C) forms a dispersed phase, and the ethylene-vinyl alcohol copolymer or modified ethylene-vinyl alcohol copolymer (A) forms a continuous phase.

5. The thermoplastic elastomer composition according to claim 2, further comprising from 0.1 to 10 parts by weight of a compound (D) having two or more hydroxyl groups in one molecule based on 100 parts by weight of the acid-modified elastomer (C).

6. The thermoplastic elastomer composition according to claim 2, wherein the modified ethylene-vinyl alcohol copolymer is an aliphatic polyester-modified ethylene-vinyl alcohol copolymer.

7. The thermoplastic elastomer composition according to claim 2, wherein the volume ratio (A/B) of the ethylene-vinyl alcohol copolymer or modified ethylene-vinyl alcohol copolymer (A) to the thermoplastic elastomer (B) is from 50/50 to 95/5.

8. The thermoplastic elastomer composition according to claim 1, wherein the acid-modified elastomer (C) is at least one selected from the group consisting of an acid-modified polyolefin elastomer and an acid-modified styrene elastomer.

9. The thermoplastic elastomer composition according to claim 8, wherein the acid-modified elastomer (C) forms a dispersed phase, and the ethylene-vinyl alcohol copolymer or modified ethylene-vinyl alcohol copolymer (A) forms a continuous phase.

10. The thermoplastic elastomer composition according to claim 8, further comprising from 0.1 to 10 parts by weight of a compound (D) having two or more hydroxyl groups in one molecule based on 100 parts by weight of the acid-modified elastomer (C).

11. The thermoplastic elastomer composition according to claim 8, wherein the modified ethylene-vinyl alcohol copolymer is an aliphatic polyester-modified ethylene-vinyl alcohol copolymer.

12. The thermoplastic elastomer composition according to claim 8, wherein the volume ratio (A/B) of the ethylene-vinyl alcohol copolymer or modified ethylene-vinyl alcohol copolymer (A) to the thermoplastic elastomer (B) is from 50/50 to 95/5.

13. The thermoplastic elastomer composition according to claim 1, wherein the acid-modified elastomer (C) forms a dispersed phase, and the ethylene-vinyl alcohol copolymer or modified ethylene-vinyl alcohol copolymer (A) forms a continuous phase.

14. The thermoplastic elastomer composition according to claim 13, further comprising from 0.1 to 10 parts by weight of a compound (D) having two or more hydroxyl groups in one molecule based on 100 parts by weight of the acid-modified elastomer (C).

15. The thermoplastic elastomer composition according to claim 13, wherein the modified ethylene-vinyl alcohol copolymer is an aliphatic polyester-modified ethylene-vinyl alcohol copolymer.

16. The thermoplastic elastomer composition according to claim 1, further comprising from 0.1 to 10 parts by weight of a compound (D) having two or more hydroxyl groups in one molecule based on 100 parts by weight of the acid-modified elastomer (C).

17. The thermoplastic elastomer composition according to claim 16, wherein the modified ethylene-vinyl alcohol copolymer is an aliphatic polyester-modified ethylene-vinyl alcohol copolymer.

18. The thermoplastic elastomer composition according to claim 1, wherein the modified ethylene-vinyl alcohol copolymer is an aliphatic polyester-modified ethylene-vinyl alcohol copolymer.

19. The thermoplastic elastomer composition according to claim 1, wherein the volume ratio (A/B) of the ethylene-vinyl alcohol copolymer or modified ethylene-vinyl alcohol copolymer (A) to the thermoplastic elastomer (B) is from 50/50 to 95/5.

20. A tire comprising the thermoplastic elastomer composition according claim 1.

* * * * *